United States Patent [19]

De Schepper et al.

[11] Patent Number: 4,490,338

[45] Date of Patent: Dec. 25, 1984

[54] PROCESS FOR SEPARATING TRIVALENT IRON FROM AN AQUEOUS CHLORIDE SOLUTION

[75] Inventors: Achille De Schepper, Lichtaart; Marc Coussement, Hove, both of Belgium

[73] Assignee: Metallurgie Hoboken-Overpelt, Brussels, Belgium

[21] Appl. No.: 169,518

[22] Filed: Jul. 21, 1980

[30] Foreign Application Priority Data

Aug. 13, 1979 [LU] Luxembourg ............... 81601

[51] Int. Cl.$^3$ .............................. C01G 49/00
[52] U.S. Cl. ........................ 423/54; 423/63; 423/139; 423/DIG. 4; 75/101 BE
[58] Field of Search ............ 423/139, DIG. 4, 54, 423/63, 24, 49; 75/101 BE

[56] References Cited

U.S. PATENT DOCUMENTS

| | | | |
|---|---|---|---|
| 3,586,476 | 6/1971 | Beutner | 423/139 |
| 3,758,566 | 9/1973 | Organ | 423/139 |
| 3,832,165 | 8/1974 | Kane | 423/DIG. 4 |
| 3,875,285 | 4/1975 | Nyman | 423/139 |
| 3,966,569 | 6/1976 | Reinhardt | 423/139 |
| 3,988,224 | 10/1976 | Barriere | 423/139 |
| 4,026,773 | 5/1977 | Van Peteghem | 423/139 |

FOREIGN PATENT DOCUMENTS

| | | | |
|---|---|---|---|
| 994106 | 8/1973 | Canada | 423/139 |
| 2249838 | 10/1974 | France | 423/139 |
| 2351055 | 5/1977 | France | 423/139 |
| 5823 | 6/1973 | South Africa | 423/139 |
| 1535664 | 12/1978 | United Kingdom | 423/139 |

OTHER PUBLICATIONS

Morrison et al. *Solvent Extraction in Analytical Chemistry* John Wiley, N. Y. (1957) pp. 127–142.
Marcus et al. *Ion Exchange and Solvent Extraction of Metal Complexes,* Wiley Interscience, N. Y. (1969) pp. 581,634,635,694.
Chemical Abstract, vol. 83 (1975) No. 198, 425X.

*Primary Examiner*—Gary P. Straub
*Assistant Examiner*—Robert L. Stoll
*Attorney, Agent, or Firm*—Fred Philpitt

[57] ABSTRACT

A process for separating trivalent iron from an aqueous chloride solution comprising contacting the aqueous solution with an organic phase containing an organophosphoric compound as an extracting agent for trivalent iron and at least 40 percent in volume of a long chain aliphatic alcohol, separating the iron-loaded organic phase from the aqueous solution, and re-extractng the iron from the iron-loaded organic phase by contacting the latter with water or acidulated water so as to produce an aqueous iron chloride solution.

Owing to the high alcohol content of the organic phase, iron can be re-extracted with a small amount of water.

12 Claims, No Drawings

PROCESS FOR SEPARATING TRIVALENT IRON FROM AN AQUEOUS CHLORIDE SOLUTION

The present invention relates to a process for separating trivalent iron from an aqueous chloride solution, in which the aqueous solution is contacted with an organic phase containing an organophosphoric compound as an extracting agent for trivalent iron and a long chain aliphatic alcohol as an agent to prevent emulsion formation, the iron-loaded organic phase is separated from the aqueous solution and the iron is re-extracted from the iron-loaded organic phase by contacting this organic phase with water or acidulated water so as to produce an aqueous iron chloride solution.

Such process was described in the U.S. Pat. No. 3,832,165. This known process relates to the selective extraction of trivalent iron from an aqueous chloride solution containing manganese and obtained by leaching manganiferous deep-sea nodules with hydrochloric acid; this solution could contain, moreover, nickel, copper, cobalt, lead and zinc. In that process, use is made of an organic phase that may contain a long chain aliphatic alcohol as an agent for preventing the formation of an emulsion. In that case no more long chain aliphatic alcohol is used than the quantity needed to prevent the formation of an emulsion: generally no more than about 25 percent in volume of the organic phase and preferably about 2 to about 20 percent in volume, the most preferred content being equal or inferior to about 15 percent in volume.

This known process has the disadvantage to require a rather high quantity of re-extracting agent (water or acidulated water) to re-extract the iron from the organic phase, which has an adverse effect on the installation- and operating costs relating to the re-extraction. Moreover, a rather diluted aqueous solution of iron chloride is finally obtained, which has an adverse effect on the installation- and operating costs relating to the further treatment, e.g. by pyrohydrolysis, of this aqueous solution.

The process according to the present invention avoids the above-mentioned disadvantage.

To this end, in accordance with the invention an organic phase is used containing at least about 40 percent of long chain aliphatic alcohol.

It was indeed found by the Applicant that the long chain aliphatic alcohol does not only act as an agent that prevents the formation of an emulsion but also as an extracting agent for the trivalent iron, that differs from the organophosphoric compound by the fact that it can be freed from its iron charge with a much smaller quantity of re-extracting agent.

The process of the present invention allows to take fullest advantage of this particularly interesting property of the long chain aliphatic alcohol.

Preferably, use is made of an organic phase containing no more than about 55 percent in volume of long chain aliphatic alcohol, since it was found that for a content that is superior to about 55 percent, the viscosity of the organic phase becomes rather high and the loss of alcohol rather important.

It is also advantageous to use an organic phase containing at least about 10 percent in volume of the organophosphoric compound, since, if it contains less than about 10 percent of the organophosphoric compound, it has a small extracting capacity.

The organic phase may contain from 0 to about 50 percent in volume of an inert diluent, advantageously an aliphatic diluent such as kerosene.

Can be advantageously used as a long chain aliphatic alcohol, an alcohol containing between about 8 to about 16 atoms of carbon such as isodecanol, which is preferred, and the alcohols mentioned in column 6, lines 23-27 of the aforesaid U.S. Pat. No. 3,832,165.

The organophosphoric compound is preferably chosen between the phosphoric acid esters having the formula,

the phosphonic acid esters having the formula

the phosphonous acid esters having the formula

the phosphonic acid esters having the formula

and the phosphinous acid esters having the formula

in which $R_1$, $R_2$ and $R_3$ represent the same or different, unsubstituted or substituted hydrocarbon groups.

Can be advantageously used as compound of formula (I), the phosphoric acid esters described and mentioned in column 4, lines 17-38 of the aforesaid U.S. Pat. No. 3,832,165.

Can be advantageously used as compound of formula (II), the phosphonic acid esters described and mentioned in the German Offenlegungsschrift No. 2,232,460 and the British Pat. No. 1,428,278.

Can be advantageously used as compound of formula (IV), the phosphinic acid esters described and mentioned in the German Offenlegungsschrift No. 2,315,849 and the aforesaid British Pat. No. 1,428,278.

The $Cl^-$ ions content of the aqueous starting solution is, preferably, equal or superior to about 105 g/l; otherwise, the coefficient of distribution of iron between the organic phase and the aqueous phase is too low.

The HCl content of the aqueous starting solution is preferably equal or superior to 18 g/l; otherwise, the co-extraction with the iron of other elements such as e.g. zinc, becomes rather important.

The acidity of the re-extracting agent (water or acidulated water) is advantageously just enough to avoid hydrolysis of the iron chloride. In most cases a re-extracting agent may be used with a pH ranging between about 0.8 and about 7. Water containing HCl is preferably used as acidulated water.

It may be useful to have the re-extraction preceeded by a washing of the organic phase with a small quantity of water, which makes it possible to obtain, at the re-extraction, a purer and less acid eluate. This quantity of water must be so small that the obtained wash-water contains at least about 105 g/l of Cl⁻ ions and at least about 18 g/l of HCl.

If the starting aqueous solution contains at least one of the elements Zn, Cu, Mn, Co and Ni, the iron is separated from said elements in the process of the present invention.

If the starting aqueous solution contains moreover hexavalent molybdenum and/or pentavalent vanadium, these are separated, together with the iron, from said elements in the process of the present invention.

The process of the present invention is particularly useful to treat aqueous chloride solutions, containing at least 10 g/l of trivalent iron. For treating aqueous chloride solutions containing less than 10 g/l of trivalent iron, the above mentioned prior art process that uses an organic phase containing just enough long chain aliphatic alcohol to avoid emulsion formation, is also suited. Indeed, iron extraction from the latter solutions can be carried out with an organic phase having a low concentration of the organophosphoric compound, e.g. 10% in volume of tributylphosphate. Now, it has been found that the tendency of the iron bearing organic phase to keep its iron when contacted with an aqueous re-extractant, decreases when the concentration of the organophosphoric compound in the organic phase decreases.

The examples hereafter will make better understand the process of the invention and its advantages.

EXAMPLE 1

This example deals with the separation of the trivalent iron from an aqueous chloride solution by a process of the prior art, i.e. by making use of an organic phase containing just enough long chain aliphatic alcohol to avoid the formation of an emulsion at the extraction.

The starting solution contains in g/l: 24 $Fe^{3+}$, 0.6 Zn, 4.5 Cu, 110 Mn, 0.8 Co, 4.2 Ni, 20 HCl.

Use is made of an organic phase that is composed of 40 percent in volume of tributyl phosphate (TBP), of 20 percent in volume of isodecanol and of 40 percent in volume of kerosene.

The extraction is carried out counter-currently in 5 stages, with an organic phase:aqueous phase ratio equal to 1.2.

This yields an iron-loaded organic phase and a raffinate, that contains in g/l: 0.1 $Fe^{3+}$, 0.63 Zn, 4.73 Cu, 115.2 Mn, 0.84 Co, 5.15 Ni, 4 HCl.

The iron is re-extracted from the organic phase with water, counter-currently, in 6 stages and with an organic phase:aqueous phase ratio equal to 2.5.

This yields a regenerated organic phase and an eluate containing in g/l: 59.17 $Fe^{3+}$, 0.004 Zn, 0.002 Cu, 1.47 Mn, 0.002 Co, 0.001 Ni, 35.41 HCl. The regenerated organic phase contains in g/l: 0.23 $Fe^{3+}$, 0.002 Mn and 1.34 HCl.

EXAMPLE 2

This example deals with the trivalent iron separation from an aqueous chloride solution by the process of the invention.

The starting solution is identical to the one used in example 1.

Use is made of an organic phase composed of 20 percent in volume of TBP, 50 percent in volume of isodecanol and 30 percent in volume of kerosene.

The extraction is carried out counter-currently in 5 stages with an organic phase:aqueous phase ratio equal to 1.35.

This yields an iron-loaded organic phase and a raffinate containing in g/l: 0.15 $Fe^{3+}$, 0.63 Zn, 4.75 Cu, 115.2 Mn, 0.85 Co, 5.15 Ni, 6.5 HCl.

The iron is re-extracted from the organic phase with water, counter-currently, in 5 stages and with an organic phase:aqueous phase ratio equal to 6.

This yields a regenerated organic phase and an eluate containing in g/l: 105.9 $Fe^{3+}$, 0.003 Zn, 0.002 Cu, 2.22 Mn, 0.001 Co, 0.001 Ni, 58.47 HCl. The regenerated organic phase contains in g/l: 0.20 $Fe^{3+}$, 0.001 Mn, 1.87 HCl.

When comparing the data of the examples 1 and 2, it is noticed that in both cases practically the same extracting yields (see Fe content of the raffinates) and practically the same re-extraction yields (see Fe content of the regenerated organic phases) were obtained.

To this end, in the second case, only 12 percent more organic phase had to be used for the extraction than in the first case, although the TBP content of the organic phase used in the second case was only 50 percent of that of the organic phase used in the first case, which proves that isodecanol acts as an extracting agent.

On the contrary, in the second case it was possible to use 53 percent less water than in the first case for the re-extraction, that was, moreover, carried out with one stage less in the second case, which proves that isodecanol can be much easier freed from its iron content than TBP.

EXAMPLE 3

An iron-loaded organic phase, identical to the one obtained in example 2, is washed with water, in one stage and with an organic phase:aqueous phase ratio equal to 30. This yields a washed organic phase and a wash-water containing in g/l: 73 $Fe^{3+}$, 17.2 Mn and 110 HCl.

Iron is re-extracted from the washed organic phase with water, counter-currently, in 5 stages and with an organic phase:aqueous phase ratio equal to 6.

This yields a regenerated organic phase and an eluate containing in g/l: 88.02 $Fe^{3+}$, 0.002 Zn, 0.001 Cu, 0.001 Co, 0.001 Ni, 0.43 Mn and 37 HCl.

When comparing the data of the examples 2 and 3, it is noticed that the HCl and manganese contents of the eluate can be substantially reduced by washing the loaded organic phase, with a small quantity of water before carrying on with the re-extraction properly.

EXAMPLE 4

This example deals with the separation of the trivalent iron and of the hexavalent molybdenum from an aqueous chloride solution by the process of the invention.

The starting solution contains in g/l: 26.88 $Fe^{3+}$, 0.201 $Mo^{6+}$, 0.173 $V^{4+}$, 121.1 Mn, 22.3 HCl.

The organic phase is identical to the one used in example 2.

The extraction is carried out counter-currently in 6 stages, with an organic phase:aqueous phase ratio equal to 1.35.

This yields an organic phase loaded with iron and molybdenum and a raffinate containing in g/l: 0.047 $Fe^{3+}$, 0.004 $Mo^{6+}$, 0.154 $V^{4+}$, 119.8 Mn, 4.42 HCl.

The organic phase loaded with iron and with molybdenum is washed with water, in one stage and with an organic phase:aqueous phase ratio equal to 30.

This yields a washed organic phase and a wash-water containing in g/l: 84.04 $Fe^{3+}$, 0.450 $Mo^{6+}$, 0.264 $V^{4+}$, 20.16 Mn, 108.6 HCl.

The washed organic phase contains in g/l: 17.07 $Fe^{3+}$, 0.131 $Mo^{6+}$, 0.005 $V^{4+}$, 0.29 Mn, 9.62 HCl.

The iron is re-extracted from the washed organic phase, by having this treated, counter-currently, with water, in 6 stages and with an organic phase:aqueous phase ratio equal to 5.

This yields a deferred organic phase and an eluate containing in g/l: 84.3 $Fe^{3+}$, 0.405 $Mo^{6+}$, 0.020 $V^{4+}$, 1.44 Mn, 38.87 HCl.

The deferred organic phase contains in g/l: 0.21 $Fe^{3+}$, 0.05 $Mo^{6+}$, 0.001 $V^{4+}$, 0.001 Mn, 1.85 HCl.

The iron re-extraction yield is 99.8 percent, which is largely sufficient. The molybdenum re-extraction yield is only 62 percent, which might cause problems at the recycling of the organic phase.

A process to increase considerably the said molybdenum re-extraction yield while ensuring the production of a concentrated eluate, forms the subject of the U.S. patent application called "Process for treating an organic phase containing iron chloride, molybdenum chloride and HCl" and filed on the same day as the present application by the Applicant of the present application.

We claim:

1. In the process for separating trivalent iron from an aqueous chloride solution, in which the aqueous solution is contacted with an organic phase containing a neutral organophosphoric ester as an extracting agent for trivalent iron and a long chain aliphatic alcohol as an agent to prevent emulsion formation, the iron-loaded organic phase is separated from the aqueous solution and the iron is re-extracted from the iron-loaded organic phase by contacting this organic phase with water or acidulated water so as to produce an aqueous iron chloride solution, the improvement comprising that an organic phase is used which contains at least about 40 percent in volume of a long chain aliphatic alcohol.

2. A process according to claim 1 wherein the organophosphoric acid esters is chosen from the esters having the formula:

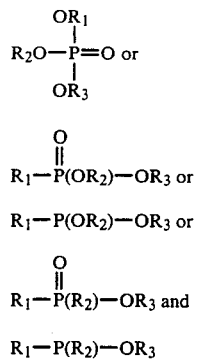

in which $R_1$, $R_2$ and $R_3$ represent the same or different unsubstituted or substituted hydrocarbon groups.

3. A process according to claim 1 wherein an organic phase is used containing from about 40 to about 55 percent of the long chain aliphatic alcohol, from about 10 to about 60 percent of the neutral organophosphoric ester and from 0 to about 50 percent of an inert diluent.

4. A process according to claim 1 or 2 or 3 wherein isodecanol is used as the long chain aliphatic alcohol.

5. A process according to claim 1 or 2 or 3 wherein tributyl phosphate is used as the neutral organophosphoric ester.

6. A process according to claim 1 or 2 or 3 wherein kerosene is used as an inert diluent.

7. A process according to claim 1 or 2 or 3 wherein the $Cl^-$ ions content of the starting solution is at least equal to about 105 g/l.

8. A process according to claim 1 or 2 or 3 wherein the HCl content of the starting solution is at least equal to about 18 g/l.

9. A process according to claim 1 or 2 or 3 wherein a starting solution is used containing at least one of the elements Zn, Cu, Mn, Co and Ni, the iron being separated from said elements.

10. A process according to claim 9 wherein a starting solution is used containing hexavalent molybdenum and/or pentavalent vanadium, the $Mo^{6+}$ and the $V^{5+}$ being separated simultaneously with the iron from said elements.

11. A process according to claim 1 or 2 or 3 wherein before carrying out the re-extraction of the iron, the organic phase is washed with a quantity of water that is so small that the obtained wash-water contains at least about 105 g/l of $Cl^-$ ions and at least about 18 g/l of HCl.

12. A process according to claim 1 or 2 or 3 wherein a starting solution is used containing at least about 10 g/l of trivalent iron.

* * * * *